(12) United States Patent
Defrain et al.

(10) Patent No.: US 12,061,777 B2
(45) Date of Patent: Aug. 13, 2024

(54) SYSTEMS AND METHODS FOR CONVEYING MULTIMOLDAL GRAPHIC CONTENT

(71) Applicant: Wichita State University, Wichita, KS (US)

(72) Inventors: Darren Defrain, Wichita, KS (US); Aaron Rodriguez, Tallahassee, FL (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 28 days.

(21) Appl. No.: 17/699,844

(22) Filed: Mar. 21, 2022

(65) Prior Publication Data

US 2022/0300126 A1  Sep. 22, 2022

Related U.S. Application Data

(60) Provisional application No. 63/164,447, filed on Mar. 22, 2021.

(51) Int. Cl.
| | |
|---|---|
| G06F 3/0483 | (2013.01) |
| G06F 3/01 | (2006.01) |
| G06F 3/04817 | (2022.01) |
| G06F 3/04842 | (2022.01) |
| G06F 3/04847 | (2022.01) |
| G06F 3/04883 | (2022.01) |
| G06F 3/16 | (2006.01) |

(52) U.S. Cl.
CPC ............ *G06F 3/0483* (2013.01); *G06F 3/016* (2013.01); *G06F 3/04817* (2013.01); *G06F 3/04842* (2013.01); *G06F 3/04847* (2013.01); *G06F 3/04883* (2013.01); *G06F 3/167* (2013.01)

(58) Field of Classification Search
None
See application file for complete search history.

(56) References Cited

U.S. PATENT DOCUMENTS

| | | | | |
|---|---|---|---|---|
| 2008/0320378 | A1* | 12/2008 | Shuter | G06T 11/60 |
| | | | | 715/203 |
| 2010/0241963 | A1* | 9/2010 | Kulis | G10L 15/22 |
| | | | | 707/706 |
| 2019/0332237 | A1* | 10/2019 | Diakov | G06F 16/54 |
| 2020/0293266 | A1* | 9/2020 | German | G10L 13/08 |

* cited by examiner

*Primary Examiner* — Tuan S Nguyen
(74) *Attorney, Agent, or Firm* — Stinson LLP (57) ABSTRACT

A screen reading system for providing accessibility to multimodal document content includes a memory storing: a document file defining a displayable document page containing text and images presented in panels to define a graphic narrative; an accessible content database stores audio files for the text and images, defined page locations for the audio files, panel locations for panels, and narrative sequencing for at least some of the audio files and the panels; and a processor-executable screen reading engine that when executed by a processor displays the document page on a display, receives user input to the display, and plays the audio files in response to the user input. The screen reading engine facilitates multiple modes of screen reading and can provide haptic feedback.

14 Claims, 2 Drawing Sheets

SYSTEMS AND METHODS FOR CONVEYING MULTIMOLDAL GRAPHIC CONTENT

CROSS-REFERENCE TO RELATED APPLICATIONS

This application claims priority to U.S. Provisional Patent Application No. 63/164,447, filed Mar. 22, 2021, which is hereby incorporated by reference in its entirety.

FIELD

The present disclosure generally relates to systems and methods for conveying multimodal graphic content through non-visual presentations and cues.

BACKGROUND

Multimodal content is now a ubiquitous form of information sharing. Because multimodal content uses multiple visual methods of communication simultaneously (e.g., text, pictures, and the relationships between the two), multimodal content is often difficult to translate to non-visual, accessible forms of content for blind and visually impaired readers. While written text can be easily translated using braille or text-to-speech programs, multimodal content is difficult to translate because it communicates a single message in diverse ways through a plurality of elements (e.g., environment, characters, artist's style, color and page layout).

In-text graphics containing multimodal content are being used in a multitude of settings such as educational, entertainment, and industry settings. Comic books which serve as an example of multimodal content and in-text graphics, are constructed using panels of text and images organized in sequential order to convey a message. Such forms of multimodal content are often difficult to translate to forms of accessible information to blind or visually impaired individuals because of the complexity of page and panel composition.

Therefore, there is a need for a system that can convey multimodal content into more accessible forms while maintaining the full context of in-text graphics and associated multimodal content.

BRIEF SUMMARY

In one aspect, a screen reading system for providing accessibility to multimodal document content comprises a document file defining a displayable document page containing formatted text and images presented in a plurality of panels on the page to define a graphic narrative and an accessible content database for the document file. The accessible content database storing a plurality of audio files for the text and images on the page, defined page locations for at least some of the audio files, panel locations for the plurality of panels, and narrative sequencing for at least some of the audio files and the plurality of panels. A processor-executable screen reading engine is configured to display the document page on a display, to receive user input to the display, and to play the audio files in response to the user input. In response to a first type of user input, the screen reading engine is configured to play at least one audio file providing a global narrative for the formatted text and images on the page. In response to a second type of user input made at the plurality of panels on the page, the screen reading engine is configured to consecutively play a subset of the audio files to provide a sequential narrative describing the formatted text and the images in the plurality of panels in an order defined by the narrative sequencing stored in the accessible content database. In response to a third type of user input made at a user-selected location on the page, the screen reading engine is configured to play one of the audio files having a defined page location corresponding to the user-selected location.

In another aspect, a screen reading system for providing accessibility to multimodal document content comprises a document file defining a displayable document page containing formatted text and images presented in a plurality of panels on the page to define a graphic narrative. An accessible content database for the document file stores narrative sequencing for the plurality of panels on the page. For each of the plurality of panels, a respective panel narrative audio file and a panel location are stored. A processor-executable screen reading engine is configured to display the document page on a display of a display device and to receive continuous input to the display on the plurality of panels. In response to the continuous input, the screen reading is configured to determine that the continuous input is a continuous press input at a first panel. In response to determining that the continuous input is being made at the first panel, the panel narrative audio file for the first panel is played. It is determined that the continuous input moves from the first panel to a third panel without intervening continuous input moving at a second panel. The narrative sequencing stored in the accessible content database defines the second panel as being sequentially between the first panel and the third panel. In response to determining that the continuous press input moves from the first panel to the third panel without an intervening continuous press input at the second panel, negative haptic feedback is produced at the display device.

Other aspects and features will be understood hereinafter.

BRIEF DESCRIPTION OF DRAWINGS

For a better understanding of the nature and objects of the disclosure, reference should be made to the following detailed description taken in conjunction with the accompanying drawings, in which.

The patent or application file contains at least one drawing executed in color. Copies of this patent or patent application publication with color drawing(s) will be provided by the Office upon request and payment of the necessary fee.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Figure 1:
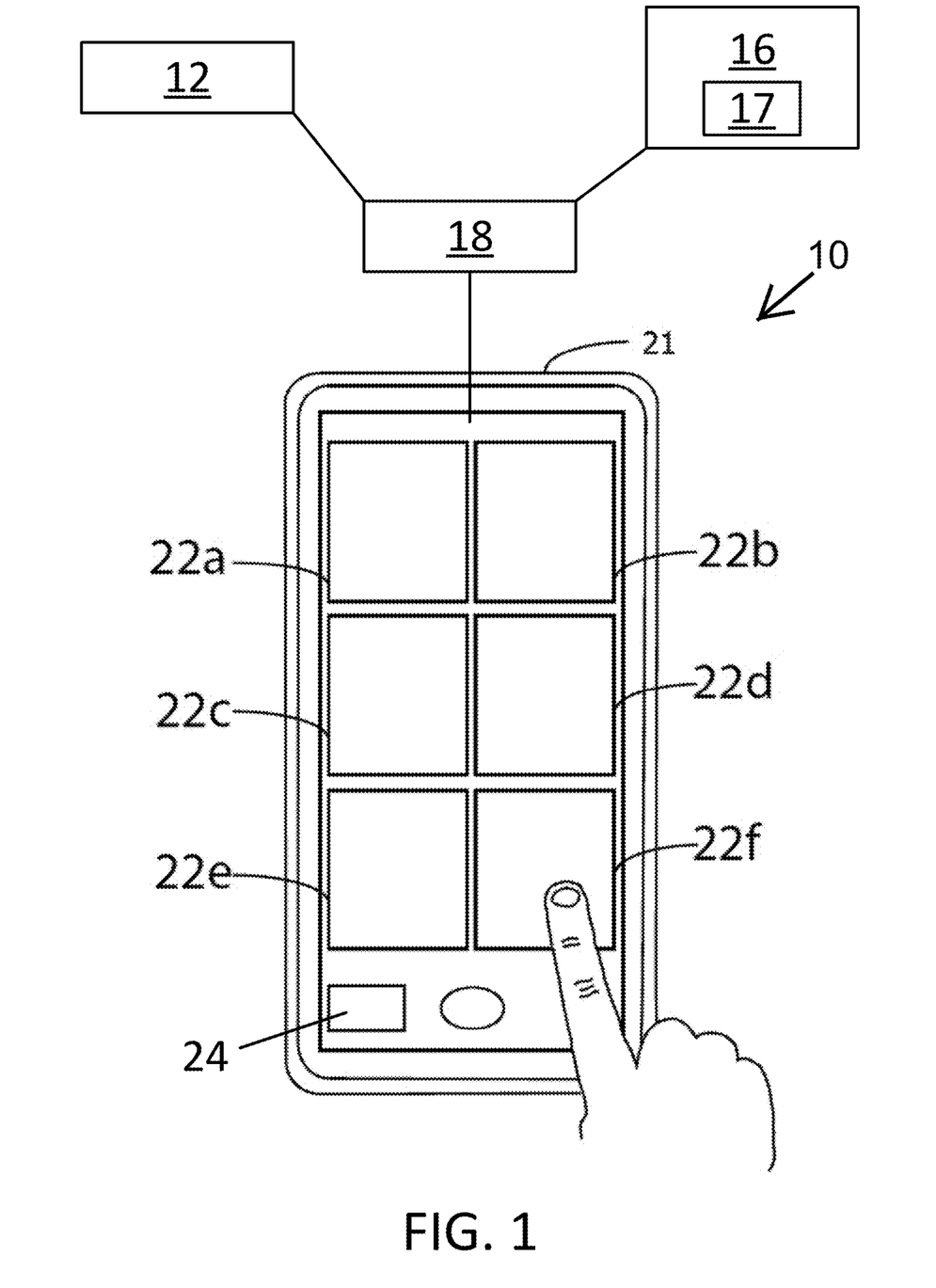
FIG. 1 is a schematic diagram of a screen reading system 10.
Figure 2:
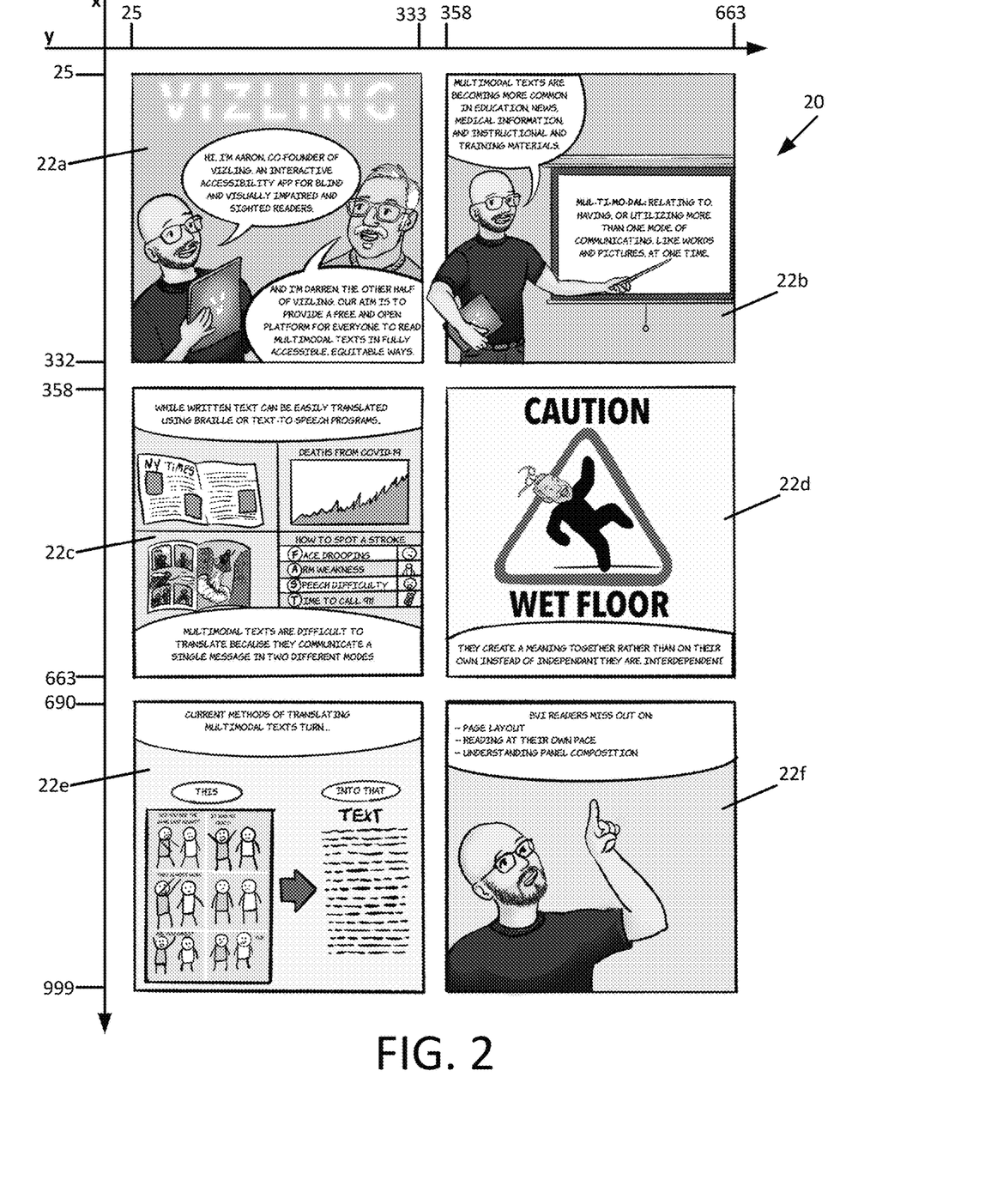
FIG. 2 is an example of a displayable document page of the screen reading system 10.

Referring to FIGS. 1 and 2, an exemplary embodiment of the screen reading system 10 according to the present disclosure comprises a memory that stores one or more document files 12, an accessible content database 16 for the document files, and processor-executable instructions defining a screen reading engine 18. Each document file 12 defines a displayable document page 20, as shown in FIG. 2. The displayable document page 20 comprises multimodal graphic content, such as a page of a comic book or textbook. A displayable document page 20 will typically contain both formatted text and images. As explained more fully below, the accessible content database 16 comprises a plurality of audio files 17 for presenting the text and image content of the displayable document page 20 in a non-visual format. The screen reading engine 18 is broadly configured to access the accessible content database and play the audio files 17 in response to user input to a display device 21 displaying the displayable document page 20. As explained more fully below, the illustrated screen reading engine 18 is configured to cause the display device 21 to produce haptic feedback to help guide a user through a sequential presentation of the page. In addition, the illustrated screen reading engine 18 is configured to facilitate multiple modes of presenting the audio content conveying the displayable document page 20. The inventors believe that the multiple presentation modes enrich the audio presentation of the of the page 20 and provide a better reproduction of the multimodal visual content that more fully captures the complex ways that the images interact with the text on the page.

In one or more embodiments, the display device 21 comprises local memory storing the document file 12, the accessible content database 16, and the screen reading engine such that the screen reading system 10 is configured to be run by local processor of the display device as a local application. In another embodiment, one or more of the document file 12, accessible content database 16, and screen reading engine 18 can be stored on a memory remote from the display device 21 such that the screen reading system 10 is run, in whole or in part, by a remote processor as a software as a service (SaaS) application.

In an exemplary embodiment, each document file 12 comprises a graphic file (e.g., a png file) defining the displayable document page 20. The page 20 is divisible into a plurality of panels 22a-22f. The boundaries of the panels 22a-22f may be clearly visible on the page 20 as shown in FIG. 2, or one or more imaginary panel boundaries may be defined by the database 16 without clearly being marked on the page. The displayable document page 20 has dimensions defined by pixels spaced along a horizontal x and a vertical y axis. As explained more fully below, the accessible content database 16 is configured to define locations of items on the displayable document page 20 in terms of the corresponding pixel coordinates along the x axis and y axis.

The illustrated display device 21 is a touchscreen display device such as a mobile phone, tablet computer, or laptop computer with touchscreen display. The screen reading engine 18 displays the desired page 20 on the display device 21, receives touch inputs to the display device, and drives an audio presentation of the multimodal page content in response to the touch inputs. The screen reading engine 18 is suitably configured to enable a user to interact with the displayable document page 20 in several different ways. More particularly, the illustrated screen reading engine 18 is configured to (i) respond to a first type of user input by playing one or more audio files providing a global narrative for all of the text and images on the display, (ii) to respond to a second type of user input by consecutively playing a set of audio files that provide a sequential narrative describing the formatted text and images in the panels 22a-22f, and (iii) respond to a third type of user input by playing an audio file describing the content at a user-selected location on the page. The inventors call (i) the "Global Narrative Mode," (ii) the "Narrative Grammar Mode," and (iii) the "Free Exploration Mode."

As shown in FIG. 1, the display includes a global narrative play icon 24 below the document page 20. To use the Global Narrative Mode, the user makes a press-and-hold input on the global narrative play icon 24. In response to the press-and-hold input on the global narrative play icon 24, the screen reading engine 18 is configured to play at least one audio file providing the global narrative for the formatted text and images on the page. In one or more embodiments, the Global Narrative Mode is akin to an audiobook, wherein a narrator tells a story uninterrupted except by chapter breaks. This reading mode allows users to understand the general narrative of the text. The global narrative audio plays continuously while the user continuously presses the icon 24. When the user stops pressing the icon 24, the engine 18 pauses the global narrative. If the user subsequently resumes pressing and holding the icon 24 without making any other touch inputs, the system unpauses and resumes playing the global narrative from the point at which it paused. An exemplary algorithm by which the screen reading engine 18 can execute a Global Narrative Mode in the scope of the present disclosure is given in the pseudocode below.

```
IF "finger press play button"
    PLAY (globalNarrativeMode)
UNTIL
    IF (globalNarrativeMode) = no audio remaining
        PLAY (silence)
    IF user stops "finger press play button"
        PAUSE (globalNarrativeMode)
        IF user starts "finger press play mode" without inputing a
        different command
            UNPAUSE (globalNarrativeMode)
```

In the Narrative Grammar Mode, the screen reading engine 18 is configured to respond to a different type of user input by consecutively playing a plurality of panel narrative audio files to provide a sequential, panel-by-panel narrative for each panel 22a-22f in accordance with the user inputs. In an exemplary embodiment, the screen reading engine 18 executes the Narrative Grammar Mode in response to continuous touch inputs at the panels 22a-22f In one or more embodiments, the screen reading engine 18 is configured to distinguish between continuous touch inputs and momentary tap inputs based on the amount of continuous contact time between the user's finger and the screen of the display device 21. For example, the screen reading engine 18 recognizes a continuous touch input when the user continuously touches the panel area for a predefined minimum contact time such as 0.25 seconds.

The accessible content database stores a panel narrative audio file for each of the panels 22a-22f on the page 20. In general, the screen reading engine 18 is configured to play the corresponding panel narrative audio file when a user makes a continuous touch input on one of the panels 22a-22f But in order to guide a visually impaired user to traverse the panels 22a-22f in the order of the panel-by-panel sequencing that is visually apparent on the page, certain continuous touch inputs to the panels 22a-22f yield no playback and negative haptic feedback. The accessible content database 16 stores narrative sequencing that defines the order of the panels 22a-22f on the page 20. Based on the stored narrative sequencing, the screen reading engine is configured to respond to continuous touch inputs to the panels 22a-22f in one of two ways.

First, when a continuous touch input is made at one of the panels in the proper order, the screen reading engine 18 responds by instructing the device 21 to produce positive haptic feedback (e.g., a single vibration, a short vibration, and/or a low intensity vibration) and playing the panel narrative audio file 17 for the panel. The panel narrative audio plays continuously while the user continuously presses the panel 22a-22f When the user stops pressing the panel, the engine 18 pauses the panel narrative. If the user subsequently resumes pressing and holding the panel 22a-224 without making any other touch inputs, the system unpauses and resumes playing the panel narrative from the point at which it paused.

Second, when a continuous touch input is made at one of the panels 22a-22f in an out-of-order sequence, the screen reading engine responds by instructing the device 21 to produce negative haptic feedback (e.g., two or more vibrations, a long vibration, and/or a high intensity vibration). The screen reading engine 18 also responds to an out-of-order continuous touch input by refraining from playing any audio.

An exemplary algorithm by which the screen reading engine 18 can conduct the Narrative Grammar Mode is shown in the pseudocode below.

```
IF "finger press and hold" > .25 seconds and = panel_1
    PLAY (haptic_feedback1), (panel_1);
    REPEAT PLAY (panel_1)
    UNTIL
        IF User stops "finger press and hold"
            THEN stop PLAY (panel_1)
        IF "finger press and hold" = panel_2
            THEN play (haptic_feedback1), (panel_2)
                IF panels on page > 2, REPEAT (panel_2) to
                (panel_3) to (panel_4) etc.
                    UNTIL number of untouched panels in numerical
                    sequence = 0
        IF "finger press and hold" != panel_2
            THEN PLAY (haptic_feedback2), (silence)
                EXCEPTION:
                    WHEN "finger press and hold" moves back
                    to panel_2 while touching the screen
                        Play (haptic_feedback1), (panel_2)
```

Accordingly, whereas the Global Narrative Mode provides a generalized overview of the document page 20 without indicating the graphic layout, the Narrative Grammar Mode emphasizes the formal grammar of graphic narratives. Because panels in graphic narratives are arranged in sequential order (like sentences in a paragraph are arranged in logical order), the system employs haptic feedback and only plays the panel narrative when the user is pressing the correct panel to ensure sequential reading. The inventors believe that this provides a visually impaired reader with fuller sense of the graphic narrative than can be achieved using conventional screen reading systems.

The third reading mode, Free Exploration Mode, emphasizes the composition of individual panels as well as the general layout of the page. This mode allows readers to explore the page in fine detail. Some of the audio files 17 in the accessible content database 16 are location-specific audio files used only for the Free Exploration Mode. The accessible content database 16 defines particular locations on the page 20 for each of the location-specific audio files 17, e.g., in terms of the x-axis and y-axis locations of a particular image on the page. In the Free Exploration Mode, the screen reading engine 18 is configured to respond to a third type of user input by playing the location-specific audio files. In the preferred embodiment, the screen reading engine 18 is configured to play the location-specific audio files in response to momentary tap inputs to various locations on the panels 22a-22f. Again, the screen reading engine 18 is configured to distinguish between momentary tap inputs and continuous touch inputs based on the amount of continuous contact time between the user's finger and the screen of the display device 21. For example, the screen reading engine 18 recognizes a momentary tap input when the user taps the panel area for less than a predefined minimum contact time, such as 0.25 seconds. An exemplary algorithm by which the screen reading engine 18 can conduct the Free Exploration Mode is shown in the pseudocode below.

```
IF "finger tap" < .25 seconds
    PLAY (object_at_coord_x)
```

Many documents contain more than one page. The illustrated screen reading system 10 is configured to accommodate multipage documents. More particularly, the screen reading engine 18 is configured to turn from the current page on the display to the next page in response to a user input swiping left and to turn from the current page to the previous page in response to a user input swiping right. After the page turn input, the screen reading engine 18 is configured to display the displayable document page 20 for the next or previous page of the document file 12. An exemplary algorithm by which the screen reading engine can conduct page turns is shown in the pseudocode below.

```
IF "swipe left"
    TURN (page +1)
IF "swipe right"
    TURN (page -1)
```

Table 1 below shows exemplary aspects of the accessible content database 16 for the example displayable document page 20 depicted in FIG. 2. As shown below, the database 16 stores a global narrative audio file entitled "b1_p1.mp3," panel narrative audio files for each of the six panels 22a-22f on the page 20, and a large number of location specific audio files for various graphics on the page. In Table 1 below, the location of each panel and the location of each graphic item associated with a location-specific audio file is defined by a rectangular region of pixels in the original document file 12. The "left" column defines the x-axis location of the left edge of the respective page location, the "right" column defines the x-axis location of the right edge of the respective page location, the "top" column defines the y-axis location of the top edge of the respective page location, and the "bot." column defines the y-axis location of the bottom edge of the respective page location. Those skilled in the art will recognize that the pixel locations of the left, right, top, and bottom edges can easily be converted to Json dimensions by taking the pixel value in each column and dividing it by the total number of pixels along the width (x axis) or height (y axis) respectively, and multiplying the result by 100. This allows the accessible content database 16 to be defined in a Json format so that the screen reading engine 18 can execute in JavaScript. In the illustrated embodiment, the narrative sequencing for the panels is defined by the order of integers in the ID column of Table 1.

TABLE 1

| Description | Type | ID | Left | Top | Right | Bot. | Audio File Name |
| --- | --- | --- | --- | --- | --- | --- | --- |
| Page 1 | Global | NA | | | | | b1_p1.mp3 |
| Panel 1 - Upper Left | Grammar | 1 | 25 | 25 | 333 | 332 | b1_p1_pn1.mp3 |
| Panel 2 - Upper Right | Grammar | 2 | 358 | 26 | 663 | 332 | b1_p1_pn2.mp3 |
| Panel 3 - Middle Left | Grammar | 3 | 25 | 358 | 333 | 663 | b1_p1_pn3.mp3 |
| Panel 4 - Middle Right | Grammar | 4 | 358 | 358 | 663 | 663 | b1_p1_pn4.mp3 |
| Panel 5 - Lower Left | Grammar | 5 | 25 | 690 | 333 | 998 | b1_p1_pn5.mp3 |
| Panel 6 - Lower Right | Grammar | 6 | 358 | 690 | 663 | 999 | b1_p1_pn6.mp3 |
| Logo (Panel 1) | Free | 101 | 54 | 34 | 305 | 76 | b1_p1_pn1_vizling_logo.mp3 |
| Aaron Tablet (Panel 1) | Free | 102 | 29 | 155 | 148 | 330 | b1_p1_pn1_aaron_tablet.mp3 |
| Darren (Panel 1) | Free | 103 | 257 | 127 | 326 | 222 | b1_p1_pn1_darren.mp3 |
| (Aaron) Panel 1 | Free | 104 | 93 | 103 | 253 | 180 | b1_p1_pn1_aaron_speech_balloon.mp3 |
| Darren Speech Bubble (Panel 1) | Free | 105 | 148 | 231 | 332 | 330 | b1_p1_pn1_darren_speech_balloon.mp3 |
| Tablet (Panel 2) | Free | 106 | 374 | 129 | 473 | 329 | b1_p1_pn2_aaron_tablet.mp3 |
| Speech Buule (Panel 2) | Free | 107 | 360 | 30 | 473 | 329 | b1_p1_pn2_aaron_speech_balloon.mp3 |
| Projector Screen (Panel 2) | Free | 108 | 469 | 123 | 660 | 269 | b1_p1_pn2_projector_screen.mp3 |
| Top Narrative Bloc (Panel 3) | Free | 109 | 27 | 361 | 329 | 404 | b1_p1_pn3_narrative_block_top.mp3 |
| Bottom Narrative Bloc (Panel 3) | Free | 110 | 29 | 605 | 329 | 660 | b1_p1_pn3_narrative_block_bottom.mp3 |
| NY Times Panel 3 | Free | 111 | 29 | 428 | 166 | 507 | b1_p1_pn3_new_york_times.mp3 |
| Covid Chart (Panel 3) | Free | 112 | 192 | 422 | 317 | 503 | b1_p1_pn3_covid_chart.mp3 |
| Comic (Panel 3) | Free | 113 | 41 | 521 | 150 | 590 | b1_p1_pn3_comic.mp3 |
| Stroke Chart (Panel 3) | Free | 114 | 181 | 512 | 330 | 590 | b1_p1_pn3_stroke_chart.mp3 |
| Caution (Panel 4) | Free | 115 | 436 | 369 | 574 | 398 | b1_p1_pn4_caution.mp3 |
| Darren Slipping (Panel 4) | Free | 116 | 417 | 401 | 597 | 398 | b1_p1_pn4_darren_slipping.mp3 |
| Wet Floor (Panel 4) | Free | 117 | 422 | 574 | 594 | 602 | b1_p1_pn4_wet_floor.mp3 |
| Bottom Narrative Block (Panel 4) | Free | 118 | 361 | 615 | 659 | 661 | b1_p1_pn4_narrative_block_bottom.mp3 |
| Top Narrative Block (Panel 5) | Free | 119 | 29 | 693 | 330 | 732 | b1_p1_pn5_narrative_block_top.mp3 |
| Circle This (Panel 5) | Free | 120 | 69 | 776 | 137 | 795 | b1_p1_pn5_circle_this.mp3 |
| Circle That (Panel 5) | Free | 121 | 232 | 776 | 302 | 794 | b1_p1_pn5_circle_that.mp3 |
| Comic (Panel 5) | Free | 122 | 41 | 804 | 172 | 989 | b1_p1_pn5_example_generic_comic.mp3 |

TABLE 1-continued

| Description | Type | ID | Left | Top | Right | Bot. | Audio File Name |
|---|---|---|---|---|---|---|---|
| Text (Panel 5) | Free | 123 | 223 | 803 | 320 | 959 | b1_p1_pn5_example_of_text.mp3 |
| Aaron Pointing (Panel 6) | Free | 124 | 360 | 780 | 596 | 995 | b1_p1_pn6_aaron_pointing.mp3 |
| Top Narrative Bloc (Panel 6) | Free | 125 | 361 | 695 | 662 | 766 | b1_p1_pn6_narrative_block_top.mp3 |

EXAMPLE

A walkthrough example of a method of using the screen reading system 10 to present the multimodal graphic content of the document page 20 will now be described. It will be understood that the following example is to aid the reader's understanding of the invention's and is in no way limiting. For purposes of explanation, the example is tailored to the multimodal content on the document page 20 in FIG. 2. It will be understood, however, that the screen reading system 10 can present any multimodal document, and that the locations, text, images, and audio for the document will vary in accordance with document content and editorial preferences.

If the user would like a comprehensive description of the multimodal content of document page 20, the user presses and hold the global narrative play icon 24. As explained above the screen reading engine 18 responds by playing the global narrative audio file (e.g., b1p1.mp3 from Table 1 above). For example, the global narrative audio file might consist of the following:

"Beneath the glowing word Vizling, we meet Aaron, a young man with a shaved head and short beard wearing glasses, and Darren, a graying man with a moustache and small beard wearing yellow glasses. Aaron, holding a laptop with a Vizling logo on it, says, "Hi, I'm Aaron, co-founder of Vizling, an interactive accessibility app for blind and visually impaired and sighted readers." Darren then introduces himself as well, "And I'm Darren, the other half of Vizling. Our aim is to provide a free and open platform for everyone to read multimodal texts in fully accessible, equitable ways."

"Aaron then points to a definition of the word "Multimodal" displayed on a hanging screen. "Multimodal texts," he explains, "are becoming more common in education, news, medical information, and instructional training materials." The definition of the word Aaron points to reads: "Multimodal: relating to, having, or utilizing more than one mode of communicating, like words and pictures, at one time."

"While written text can be easily translated using braille or text-to-speech programs, multimodal texts are difficult to translate because they communicate a single message in two different modes. Examples provided here are pages from the New York Times, a chart showing the rising rate of COVID-19 deaths, a superhero comic and a mnemonic chart for understanding how to spot a stroke."

"Multimodal texts create a meaning together rather than on their own, such as one might encounter with a "CAUTION: WET FLOOR" sign that shows the image of a person slipping and falling in addition to the words in order to emphasize the risk. Instead of independent, the words and image are interdependent."

"Other current methods of translating multimodal texts simply turn something like a comic into text, but BVI readers miss out on page layout, reading at their own pace, and understanding panel composition."

To use the screen reading system in Narrative Grammar Mode, the user must first make a continuous input to the first panel 22*a* (in the illustrated example, the first panel is defined as the rectangle between pixels 25 and 333 along the x axis and between pixels 25 and 332 along the y axis). Continuous input anywhere else on the page 20 will not result in any audio being played. In response to a continuous input on the first panel, the screen reading engine 18 plays the panel narrative audio file for the first panel (e.g., b1_p1_pn1.mp3 from Table 1 above). For example, the panel narrative audio file might consist of the following audio: "Page one. Panel one. In the upper left corner panel, two comic figures are addressing the reader under the Vizling logo. Aaron, a young man with a beard, glasses and a shaved head is holding a tablet with the Vizling 'V' on its back. Aaron says 'Hi, I'm Aaron. Co-founder of Vizling, an interactive accessibility app for blind and visually impaired readers.' To his right is Darren, who is older, with graying hair and a moustache. He is wearing yellow glasses. Darren continues, 'And I'm Darren. The other half of Vizling. Our aim is to provide a free and open platform for everyone to read multimodal texts in fully accessible, equitable ways.'"

After beginning the Narrative Grammar Mode with the first panel, no other panel narrative audio files will play until the user makes a continuous touch input to the second panel 22*b* (in the illustrated example, the second panel is defined as the rectangle between the rectangle between pixels 358 and 663 along the x axis and between pixels 25 and 332 along the y axis). If, for example, the user slides her finger from the first panel to a location on the third panel 22*c* (in the illustrated example, the third panel is defined as the rectangle between the rectangle between pixels 25 and 333 along the x axis and between pixels 358 and 663 along the y axis), the screen reading engine 18 will produce negative haptic feedback and keep silent. Subsequently, if the user makes a continuous touch input on the second panel 22*b*, the screen reading engine 18 will produce positive haptic feedback and play the audio file for the second panel (e.g., b1_p1_pn2.mp3 from Table 1 above). The panel narrative audio file might consist of the following audio: "Panel two, upper right. Aaron is addressing the reader while holding his tablet in one hand and using a pointer with his other hand to emphasize a definition on a dropdown screen. Those words read: Multimodal (which is spelled phonetically): Relating to, having or utilizing more than one mode of communicating, like words and pictures at one time. Aaron explains, 'Multimodal texts are becoming more common in education, news, medical information, and instruction and training materials.'"

This process can repeat until the user has listened to the panel narrative audio files for each of the panels 22a-22f, in order.

At any time during use, the user can use the Free Exploration Mode to study the graphics on the page 20 in detail. Tapping anywhere on the screen where there is corresponding location-specific audio will cause the screen reading engine 18 to play the corresponding location specific audio files 17. For example, if the user taps within a rectangle extending between pixels 29 and 166 along the x axis and between pixels 428 and 507 along the y axis, the screen reading engine responds by playing audio file b1_p1_pn3_new_york_times.mp3 from Table 1 above, which consists of the following statement: "New York Times." If the user taps within a rectangle extending between pixels 361 and 659 along the x axis and between pixels 615 and 661 along the y axis, the screen reading engine responds by playing audio file b1_p1_pn34_narrative_block_top.mp3 from Table 1 above, which consists of the following statement: "A narrative block below an image of a caution sign explains that that text and images in multi-modal documents create meaning together rather than on their own. Instead of independent, they are interdependent."

When the user is ready to turn to a different page, she simply swipes left or ride to page forward or backward through the document.

It can now be seen that the inventors' screen reading system 10 provides an improved way of conveying multimodal document content in an accessible format. The screen reading system uses multiple reading modes to provide a rich audio presentation that more closely simulates the experience of visually consuming the text and images on the page. Like more conventional screen reading systems, the illustrated screen reading system 10 provides the Global Narrative Mode to obtain a general, uninterrupted narrative for the entire page 20. But if a user would rather traverse the page in a panel-by-panel fashion, e.g., to get a better sense of the formal grammar of the graphic narrative, the Narrative Grammar Mode provides the user such an experience. In much the same way as how a visual reader will quickly recognize when the panels are read out of order, the haptic responses provide the same type of instant feedback regarding sequencing for the visually impaired user. Lastly, if the user wants to understand any of the images on the page in great detail, the Free Exploration Mode provides location-specific audio with comprehensive explanations of the images on the page. Using the Free Exploration Mode, the user can tap at several points along the screen to obtain an understanding of how various graphic items are arranged on the page. Accordingly, the inventors believe that, as compared with convention screen reading systems, the illustrated screen reading system 10 provides a richer audio presentation of the of the page 20 and a better reproduction of multimodal visual content to effectively simulate the way a visual reader might interact with the layout and relationships of the text and images on the page.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and, in its operation, can be made by those skilled in the art without departing in any way from the spirit of the present disclosure.

Furthermore, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

The term "engine" may refer to, be part of, or include processor hardware (shared, dedicated, or group) that executes code and memory hardware (shared, dedicated, or group) that stores code executed by the processor hardware.

The engine may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The engine may communicate with other components using the interface circuit(s). Although the engine may be depicted in the present disclosure as logically communicating directly with other components, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the engine may be distributed among multiple modules that are connected via the communications system. For example, multiple modules may implement the same functionality distributed by a load balancing system. In a further example, the functionality of the engine may be split between a server (also known as remote, or cloud) module and a client (or, user) module.

The term "processor-executable instructions," as used above, may include software, firmware, and/or microcode, and may refer to programs, routines, functions, classes, data structures, and/or objects. Shared processor hardware encompasses a single microprocessor that executes some or all instructions from multiple modules. Group processor hardware encompasses a microprocessor that, in combination with additional microprocessors, executes some or all instructions from one or more modules. References to multiple microprocessors encompass multiple microprocessors on discrete dies, multiple microprocessors on a single die, multiple cores of a single microprocessor, multiple threads of a single microprocessor, or a combination of the above.

The term memory is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), RDF (resource description framework), CSV (comma separated values) or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Embodiments with various modifications as are suited to the particular use contemplated.

What is claimed is:

1. A screen reading system for providing accessibility to multimodal document content, the screen reading system comprising:
   a document file defining a displayable document page containing formatted text and images presented in a plurality of panels on the page to define a graphic narrative;
   an accessible content database for the document file, the accessible content database storing a plurality of audio files for the text and images on the page defined page locations for at least some of the audio files, panel locations for the plurality of panels, and narrative sequencing for at least some of the audio files and the plurality of panels, wherein the plurality of audio files includes one panel narrative audio file for each of the plurality of panels; and a processor configured to control a screen reading engine configured to display the document page on a display, to receive user input to the display, and to play the audio files in response to the user input, wherein:
      in response to a first type of user input, the screen reading engine is configured to play at least one audio file providing a global narrative for the formatted text and images on the page;
      in response to a second type of user input made at the plurality of panels on the page, the screen reading engine is configured to play the panel narrative audio files to provide a sequential narrative describing the formatted text and the images in the plurality of panels in an order defined by the narrative sequencing stored in the accessible content database, wherein in response to the second type of input at one of the plurality of panels, the screen reading engine is configured to only play the respective panel narrative audio file for said one of the plurality panels and to refrain from playing any other panel narrative audio file until the second type of input is applied at another one of the plurality of panels; and
      in response to a third type of user input made at a user-selected location on the page, the screen reading engine is configured to play one of the audio files having the defined page location corresponding to the user-selected location.

2. The screen reading system as set forth in claim 1, wherein the first type of user input comprises a press-and-hold input on a global narrative play icon on the display.

3. The screen reading system as set forth in claim 1, wherein the second type of user input comprises a continuous input at the plurality of panels.

4. The screen reading system as set forth in claim 1, wherein in response to the continuous input being a swipe input moving from a first panel to a next panel as defined in the narrative sequencing, the screen reading engine is configured to switch from playing the panel narrative audio file for the first panel to playing of the panel narrative audio file for the next panel.

5. The screen reading system as set forth in claim 4, wherein in response to the continuous input being a swipe input moving from the first panel to another panel besides the next panel, the screen reading engine is configured to produce negative haptic feedback.

6. The screen reading system as set forth in claim 5, wherein in response to the continuous input being a swipe input moving from the first panel to the next panel, the screen reading engine is configured to produce positive haptic feedback.

7. The screen reading system as set forth in claim 1, wherein the third type of user input comprises a momentary tap input at the user-selected location.

8. The screen reading system as set forth in claim 1, wherein the displayable document page presents a page of a comic book.

9. The screen reading system as set forth in claim 1, wherein the displayable document page presents a page of a textbook.

10. A screen reading system for providing accessibility to multimodal document content, the screen reading system comprising:
 a document file defining a displayable document page containing formatted text and images presented in a plurality of panels on the page to define a graphic narrative;
 an accessible content database for the document file storing narrative sequencing for the plurality of panels on the page including at least a first panel, a second panel, and a third panel, and for each of the plurality of panels, storing a respective panel narrative audio file and a panel location; and
 a processor configured to control a screen reading engine configured to display the document page on a display of a display device, to receive continuous input to the display on the plurality of panels, wherein in response to the continuous input the screen reading is configured to:
  determine based on the panel locations stored in the accessible content database that the continuous input is a continuous press input at the first panel;
  in response to determining that the continuous input is being made at the first panel, play the panel narrative audio file for the first panel;
  determine based on the panel locations stored in the accessible content database that the continuous input moves from the first panel to the third panel without intervening continuous input at the second panel, wherein the narrative sequencing stored in the accessible content database defines the second panel as being sequentially between the first panel and the third panel; and
  in response to determining that the continuous press input moves from the first panel to the third panel without an intervening continuous press input at the second panel, producing negative haptic feedback at the display device.

11. The screen reading system as set forth in claim 10, wherein in response to determining that the continuous press input moves from the first panel to the third panel without an intervening continuous press input at the second panel, the screen reading engine is further configured to refrain from playing audio.

12. The screen reading system as set forth in claim 10, wherein the screen reading engine is further configured to determine that the continuous press input moves consecutively from the first panel to the second panel.

13. The screen reading system as set forth in claim 12, wherein in response to determining that the continuous press input moves consecutively from the first panel to the second panel, the screen reading engine is configured to play the panel narrative audio file for the second panel.

14. The screen reading system as set forth in claim 12, wherein in response to determining that the continuous press input moves consecutively from the first panel to the second panel, the screen reading engine is configured to produce positive haptic feedback at the display device, the positive haptic feedback being different than the negative haptic feedback.

* * * * *